(12) United States Patent
Endo et al.

(10) Patent No.: US 9,145,125 B2
(45) Date of Patent: Sep. 29, 2015

(54) CONTROL APPARATUS FOR VEHICLE

(71) Applicants: Hiroki Endo, Nissin (JP); Koji Hokoi, Toyota (JP)

(72) Inventors: Hiroki Endo, Nissin (JP); Koji Hokoi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 29 days.

(21) Appl. No.: 14/222,096

(22) Filed: Mar. 21, 2014

(65) Prior Publication Data

US 2014/0288744 A1   Sep. 25, 2014

(30) Foreign Application Priority Data

Mar. 25, 2013   (JP) .................................. 2013-062196

(51) Int. Cl.
| | | |
|---|---|---|
| B60L 9/00 | (2006.01) |
| B60W 10/08 | (2006.01) |
| B60W 10/06 | (2006.01) |
| B60W 10/26 | (2006.01) |
| G06F 19/00 | (2011.01) |
| B60K 6/22 | (2007.10) |
| B60W 10/04 | (2006.01) |
| B60W 20/00 | (2006.01) |
| B60K 6/445 | (2007.10) |

(52) U.S. Cl.
CPC .............. *B60W 10/08* (2013.01); *B60W 10/06* (2013.01); *B60W 10/26* (2013.01); *B60W 20/40* (2013.01); *B60K 6/22* (2013.01); *B60K 6/445* (2013.01); *B60W 10/04* (2013.01); *B60W 20/00* (2013.01); *B60W 2510/244* (2013.01); *B60W 2520/10* (2013.01); *G06F 19/00* (2013.01); *Y02T 10/6239* (2013.01); *Y02T 10/6286* (2013.01); *Y02T 10/7077* (2013.01); *Y10S 903/93* (2013.01)

(58) Field of Classification Search
CPC ..... B60W 20/00; B60W 10/06; B60W 10/08; B60W 10/04; B60K 6/445; B60K 6/22; F02D 43/00; F01N 7/00; F01N 3/00; G06F 19/00; Y02T 10/7077
See application file for complete search history.

(56) References Cited

U.S. PATENT DOCUMENTS

| | | | |
|---|---|---|---|
| 7,677,341 B2 * | 3/2010 | Tomo ...................... 180/65.265 |
| 8,050,851 B2 * | 11/2011 | Aoki et al. .................... 701/112 |
| 2006/0218896 A1 * | 10/2006 | Ando et al. ..................... 60/277 |
| 2008/0099259 A1 * | 5/2008 | Tomo ........................... 180/65.2 |
| 2009/0204314 A1 * | 8/2009 | Aoki et al. .................... 701/112 |
| 2009/0240387 A1 | 9/2009 | Kawai et al. |
| 2012/0041630 A1 * | 2/2012 | Yamamoto et al. ............. 701/22 |

(Continued)

FOREIGN PATENT DOCUMENTS

| | | |
|---|---|---|
| JP | H09-154205 A | 6/1997 |
| JP | 2005-016442 A | 1/2005 |

(Continued)

*Primary Examiner* — Behrang Badii
(74) *Attorney, Agent, or Firm* — Gifford, Krass, Sprinkle, Anderson & Citkowski, P.C.

(57) ABSTRACT

A control apparatus for a vehicle includes an engine installed on the vehicle as a drive source, an electric motor installed on the vehicle as a drive source, the electric motor being configured to run the vehicle even in a condition where the engine is stopped. The control apparatus includes a controller configured to start the engine after a given delay time elapses, if a starting condition based on an operation of a driver is satisfied, the controller being configured to keep the engine stopped if the starting condition ceases to be satisfied before the delay time elapses after the starting condition is satisfied.

5 Claims, 6 Drawing Sheets

(56) References Cited

U.S. PATENT DOCUMENTS

2013/0144514 A1   6/2013  Choi et al.
2013/0226379 A1*  8/2013  Hirai .............................. 701/22

FOREIGN PATENT DOCUMENTS

| | | |
|---|---|---|
| JP | 2013-119381 A | 6/2013 |
| WO | 2007-141984 A1 | 12/2007 |

* cited by examiner

CONTROL APPARATUS FOR VEHICLE

INCORPORATION BY REFERENCE

The disclosure of Japanese Patent Application No. 2013-062196 filed on Mar. 25, 2013 including the specification, drawings and abstract is incorporated herein by reference in its entirety.

BACKGROUND OF THE INVENTION

1. Field of the Invention

The invention relates to a control apparatus for a vehicle, and in particular to a technology for starting an engine during running of the vehicle on which the engine and an electric motor are installed as drive sources.

2. Description of Related Art

A vehicle on which an electric motor for running the vehicle is installed, in addition to an engine, is known in the art. The vehicle of this type is able to run using only the electric motor while keeping the engine stopped. When large driving force is required, such as when the operation amount of the accelerator pedal is increased, the engine is started so as to achieve the required driving force.

As described in paragraph [0010], etc. of Japanese Patent Application Publication No. 2005-16442 (JP 2005-16442 A), the engine is started after the output voltage of a converter is increased in advance up to a drive voltage at which a starting motor can produce given torque before starting of the engine. According to the technology described in JP 2005-16442 A, the engine start-up time can be reduced, as described in paragraph [0043].

SUMMARY OF THE INVENTION

However, even if the driver wishes to keep running the vehicle only with power from the motor, the driver may temporarily depress the accelerator pedal to such an extent that the engine is started. In this case, even if the driver immediately releases the accelerator pedal, the engine is started against the intention of the driver.

A control apparatus for a vehicle in accordance with the invention inhibits starting of the engine based on a temporary operation performed by the driver.

The control apparatus for a vehicle according to one aspect of the invention includes an engine installed on the vehicle as a drive source, an electric motor installed on the vehicle as a drive source, the electric motor being configured to run the vehicle even in a condition where the engine is stopped. The control apparatus includes a controller configured to start the engine after a given delay time elapses, if a starting condition based on an operation of a driver is satisfied, the controller being configured to keep the engine stopped if the starting condition ceases to be satisfied before the delay time elapses after the starting condition is satisfied. With this arrangement, even if the starting condition based on the operation of the driver is satisfied, the engine is not started until the delay time elapses; therefore, starting of the engine based on the temporary operation of the driver can be inhibited or prevented.

The control apparatus according to the above aspect of the invention, the controller may be configured to set the delay time to a longer period of time as a vehicle speed is higher. With this arrangement, when the vehicle runs at low speeds at which acceleration is likely to be required frequently, a delay in starting of the engine due to setting of the delay time can be reduced, and the required driving force can be quickly achieved.

The control apparatus according to the above aspect of the invention may further include a power storage device installed on the vehicle, the power storage device being operable to supply electric power to the electric motor. Further, the controller may be configured to start the engine before the delay time elapses after the starting condition is satisfied, if an output of the power storage device is smaller than a threshold value. With this arrangement, if the driving force provided only by the electric motor is insufficient, the controller immediately starts the engine without waiting for the delay time, thus assuring required driving force.

The control apparatus according to the above aspect of the invention may further include a power storage device installed on the vehicle, the power storage device being operable to supply electric power to the electric motor. The controller may be configured to start the engine before the delay time elapses after the starting condition is satisfied, if a remaining capacity of the power storage device is smaller than a threshold value. With this arrangement, when it may be difficult to run the vehicle using only the electric motor, the controller immediately starts the engine without waiting for the delay time, thus assuring required driving force.

The control apparatus according to the above aspect of the invention, the controller may be configured to start the engine before the delay time elapses after the starting condition is satisfied, if a condition based on equipment installed on the vehicle is satisfied. With this arrangement, the engine can be started in quick response to a request for starting the engine, if the request is not made by an erroneous or temporary operation of the driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
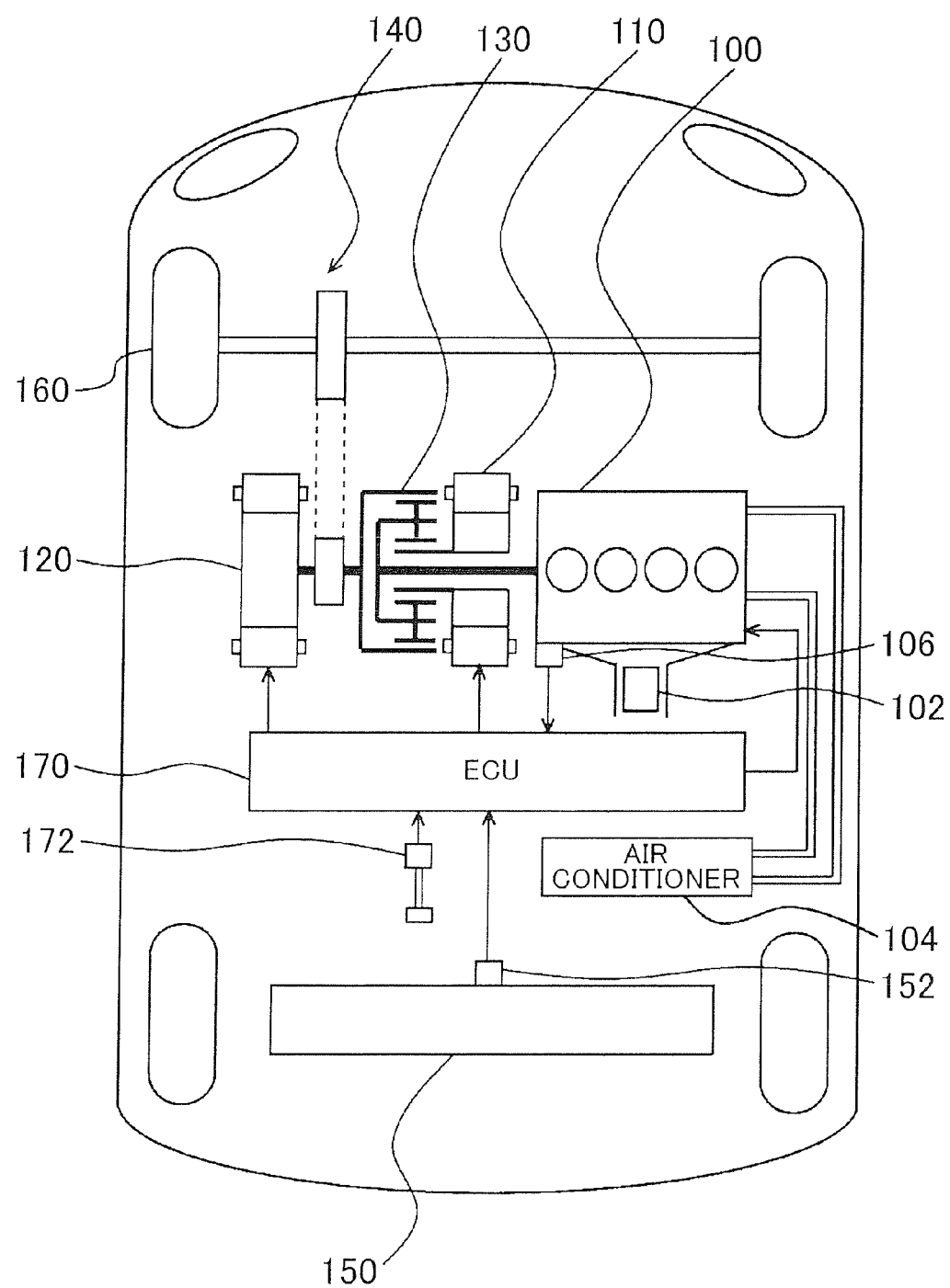
FIG. 1 is a schematic view of the construction of a vehicle.

One embodiment of the invention will be described with reference to the drawings. In the following description, the same reference numerals are assigned to the same components. These components have the same names and functions. Accordingly, these components will not be repeatedly described in detail.

Referring to FIG. 1, an engine 100, a first motor-generator 110, a second motor-generator 120, a power split device 130, a speed reducer 140, and a battery 150 are installed on a vehicle.

The engine 100, first motor-generator 110, second motor-generator 120, and the battery 150 are controlled by an ECU (Electronic Control Unit) 170. The ECU 170 may be divided into two or more ECUs.

The vehicle shown in FIG. 1 runs with driving force delivered from at least one of the engine 100 and the second motor-generator 120. Namely, one or both of the engine 100 and the second motor-generator 120 is/are automatically selected as a drive source(s) depending on operating conditions.

For example, the engine 100 and the second motor-generator 120 are controlled, according to the result of operation of an accelerator pedal 172 by the driver. The operation amount (accelerator pedal angle) of the accelerator pedal 172 is detected by an accelerator position sensor (not shown).

In the case where the accelerator operation amount is small, and the case where the vehicle speed is low, for example, the vehicle runs using only the second motor-generator 120 as the drive source. In this case, the engine 100 is stopped. However, the engine 100 may be driven for generating electric power, for example.

In the case where the accelerator operation amount is large, the case where the vehicle speed is high, and the case where the remaining capacity (SOC: State Of Charge) of the battery 150 is small, for example, the engine 100 is driven. In this case, the vehicle runs using only the engine 100, or both of the engine 100 and the second motor-generator 120, as the drive source(s).

The engine 100 is an internal combustion engine. In the engine 100, an air-fuel mixture is burned in each combustion chamber, so as to rotate a crankshaft as an output shaft. Exhaust gas emitted from the engine 100 is cleaned by a catalyst 102, and then discharged to the outside of the vehicle. The catalyst 102 exhibits its cleaning effect when it is warmed up to a particular temperature. The catalyst 102 is warmed up by utilizing heat of exhaust gas. The catalyst 102 is a three-way catalyst, for example.

The coolant of the engine 100 circulates through an air conditioner 104 installed on the vehicle. The air conditioner 104 increases the temperature of air in the vehicle interior, using the coolant of the engine 100. More specifically, the coolant and air introduced into a heater core exchange heat with each other, and warmed air is delivered into the vehicle interior. The air conditioner 104 may utilize well-known general technologies, and therefore, will not be described in detail. The temperature of the coolant of the engine 100 is detected by a temperature sensor 106.

The engine 100, first motor-generator 110, and the second motor-generator 120 are connected via the power split device 130. The power generated by the engine 100 is distributed to two paths by the power split device 130. A portion of the power transmitted through one of the paths drives front wheels 160 via the speed reducer 140. A portion of the power transmitted through the other path drives the first motor-generator 110 so as to generate electric power.

The first motor-generator 110 is a three-phase AC rotary electric machine including a U-phase coil, a V-phase coil, and a W-phase coil. The first motor-generator 110 generates electric power using the power of the engine 100 divided by the power split device 130. The electric power generated by the first motor-generator 110 is used according to running conditions of the vehicle, and the state of charge, or remaining capacity, of the battery 150. For example, during normal running, electric power generated by the first motor-generator 110 is used as it is for driving the second motor-generator 120. On the other hand, when the SOC of the battery 150 is lower than a predetermined value, electric power generated by the first motor-generator 110 is converted from AC power to DC power by an inverter that will be described later. Then, the voltage is adjusted by a converter that will be described later, and stored in the battery 150.

When the first motor-generator 110 functions as a generator, the first motor-generator 110 produces negative torque. The negative torque means torque that results in a load of the engine 100. When the first motor-generator 110 is supplied with electric power, and functions as a motor, the first motor-generator 110 produces positive torque. The positive torque means torque that does not result in a load of the engine 100, namely, torque that assists rotation of the engine 100. The second motor-generator 120 also operates in substantially the same manner as the first motor-generator 110.

The second motor-generator 120 is a three-phase AC rotary electric machine including a U-phase coil, a V-phase coil, and a W-phase coil. The second motor-generator 120 is driven with at least one of electric power stored in the battery 150 and electric power generated by the first motor-generator 110.

The driving force of the second motor-generator 120 is transmitted to the front wheels 160 via the speed reducer 140. In this manner, the second motor-generator 120 assists the engine 100 in running the vehicle, or causes the vehicle to run with driving force from the second motor-generator 120. The second motor-generator 120 may be arranged to drive rear wheels instead of or in addition to the front wheels 160.

During regenerative braking of the vehicle, the second motor-generator 120 is driven by the front wheels 160 via the speed reducer 140, so that the second motor-generator 120 operates as a generator. Thus, the second motor-generator 120 operates as a regenerative brake that converts braking energy into electric power. The electric power generated by the second motor-generator 120 is stored in the battery 150.

The power split device 130 consists of a planetary gear set including a sun gear, a pinion gear, a carrier, and a ring gear. The pinion gear engages with the sun gear and the ring gear. The carrier supports the pinion gear such that the pinion gear can rotate about itself. The sun gear is coupled to a rotary shaft of the first motor-generator 110. The carrier is coupled to the crankshaft of the engine 100. The ring gear is coupled to a rotary shaft of the second motor-generator 120 and the speed reducer 140.

The engine 100, the first motor-generator 110 and the second motor-generator 120 are coupled together via the power split device 130 in the form of the planetary gear set, such that the rotational speeds of the engine 100, first motor-generator 110 and the second motor-generator 120 are related with one another to be connected by a straight line in a nomographic chart.

The battery 150 is a battery assembly that consists of a plurality of battery modules connected in series. Each of the battery modules is formed by integrating a plurality of battery cells. The voltage of the battery 150 is about 200V, for example. The battery 150 is charged with electric power supplied from the first motor-generator 110 and the second motor-generator 120, and electric power supplied from a power supply located outside the vehicle. A capacitor may be used in place of or in addition to the battery 150. The temperature of the battery, 150 is detected by a temperature sensor 152.

Figure 2:
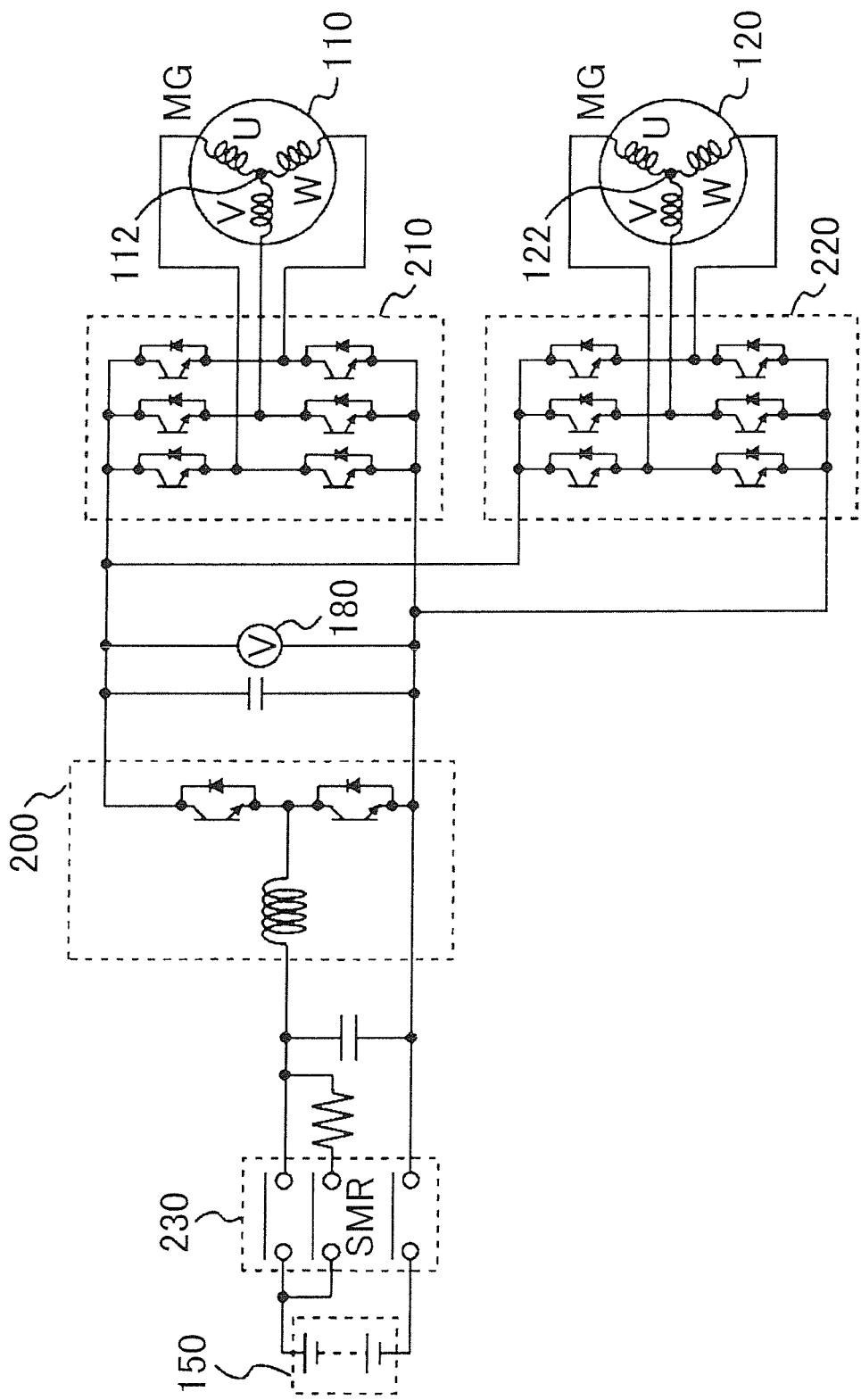
FIG. 2 is a view showing an electric system of the vehicle.

Referring to FIG. 2, the vehicle is provided with a converter 200, a first inverter 210, a second inverter 220, and a system main relay 230.

The converter 200 includes a reactor, two npn-type transistors, and two diodes. One end of the reactor is connected to the positive side of the battery, and the other end is connected to a connection point of the two npn-type transistors.

The two npn-type transistors are connected in series. The npn-type transistors are controlled by the ECU 170. A diode is connected between a collector and an emitter of each of the npn-type transistors, so that electric current flows from the emitter side to the collector side through the diode.

As the npn-type transistor, IGBT (Insulated Gate Bipolar Transistor) may be used, for example. The npn-type transistor may be replaced by a power switching device, such as a power MOSFET (Metal Oxide Semiconductor Field-Effect Transistor).

When electric power discharged from the battery 150 is supplied to the first motor-generator 110 or the second motor-generator 120, the voltage is raised by the converter 200. To the contrary, when the battery 150 is charged with electric power generated by the first motor-generator 110 or the second motor-generator 120, the voltage is reduced by the converter 200.

The system voltage VH between the converter 200 and each inverter is detected by a voltage sensor 180. The detection result of the voltage sensor 180 is transmitted to the ECU 170.

The first inverter 210 includes a U-phase arm, V-phase arm, and a W-phase arm. The U-phase arm, V-phase arm and W-phase arm are connected in parallel with each other. Each of the U-phase arm, V-phase arm and W-phase arm has two npn-type transistors connected in series. A diode is connected between a collector and an emitter of each npn-type transistor, so that electric current flows from the emitter side to the collector side. A connection point of the npn-type transistors in each arm is connected to an end portion of the corresponding coil of the first motor-generator 110, which is remote from a neutral point 112.

The first inverter 210 converts DC current supplied from the battery 150, into AC current, and supplies the AC current to the first motor-generator 110. Also, the first inverter 210 converts AC current generated by the first motor-generator 110 into DC current.

The second inverter 220 includes a U-phase arm, a V-phase arm, and a W-phase arm. The U-phase arm, V-phase arm and W-phase arm are connected in parallel with each other. Each of the U-phase arm, V-phase arm and W-phase arm has two npn-type transistors connected in series. A diode is connected between a collector and an emitter of each npn-type transistor, so that electric current flows from the emitter side to the collector side. A connection point of the npn-type transistors in each arm is connected to an end portion of the corresponding coil of the second motor-generator 120, which is remote from a neutral point 122.

The second inverter 220 converts DC current supplied from the battery 150, into AC current, and supplies the AC current to the second motor-generator 120. Also, the second inverter 220 converts AC current generated by the second motor-generator 120 into DC current.

The converter 200, first inverter 210, and the second inverter 220 are controlled by the ECU 170.

The system main relay 230 is provided between the battery 150 and the converter 200. The system main relay 230 is a relay that switches between a state in which the battery 150 is connected to the electric system, and a state in which the battery 150 is disconnected from the electric system. When the system main relay 230 is in an open state, the battery 150 is disconnected from the electric system. When the system main relay 230 is in a closed state, the battery 150 is connected to the electric system.

The state of the system main relay 230 is controlled by the ECU 170. For example, when the ECU 170 starts, the system main relay 230 is closed. When the ECU 170 stops, the system main relay 230 is opened.

Figure 3:
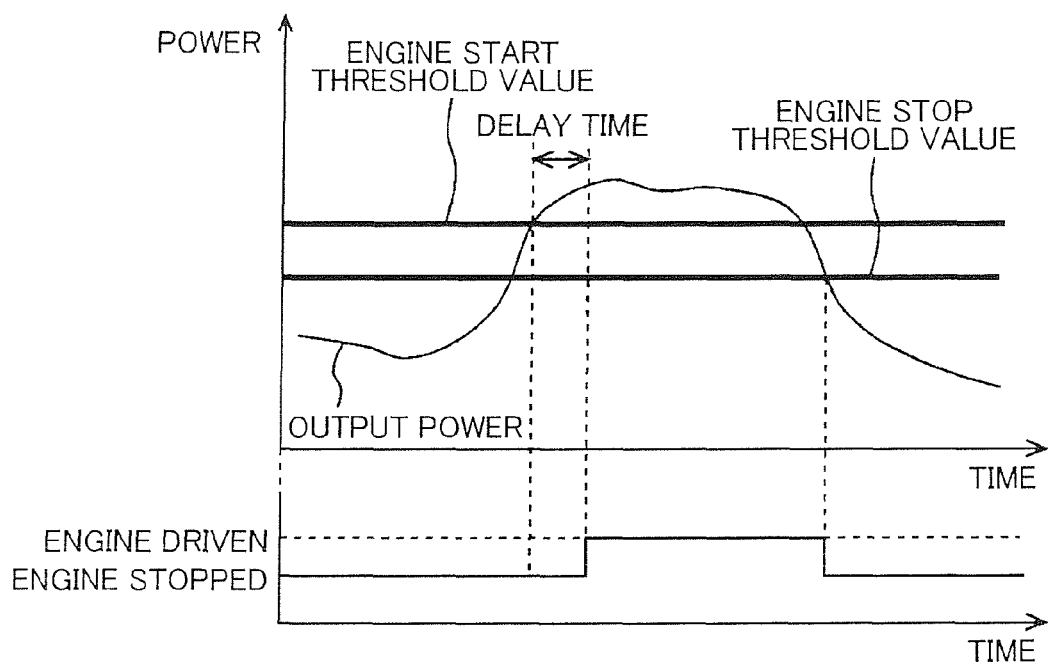
FIG. 3 is a view (No. 1) showing a state of an engine, etc.

Referring to FIG. 3, the manner of controlling the engine 100 will be further described. If the output power of the vehicle as shown in FIG. 3 is smaller than an engine start threshold value, the vehicle runs using only the driving force of the second motor-generator 120. In this case, as a general rule, fuel supply to the engine 100 is stopped, and the engine 100 is stopped.

The output power is set as power used for running the vehicle. For example, the output power is calculated by the ECU 170, according to a map having the accelerator operation amount, the vehicle speed, etc., as parameters. The method of calculating the output power is not limited to this method. Instead of using the output power, torque, acceleration, driving force, accelerator operation amount, and so forth, may be used. For example, the engine 100 may be stopped if the accelerator operation amount is smaller than a threshold value determined for each vehicle speed.

If, on the other hand, a condition that the output power of the vehicle is equal to or larger than the engine start threshold value, as one example of starting conditions based on the operation of the driver, is satisfied, the engine 100 is driven. For example, the engine 100 is started by cranking the engine 100 by means of the first motor-generator 110. As a result, the vehicle runs using the driving force of the engine 100, in addition to or in place of the driving force of the second motor-generator 120. Also, electric power generated by the first motor-generator 110 using the driving force Of the engine 100 is directly supplied to the second motor-generator 120.

Figure 4:
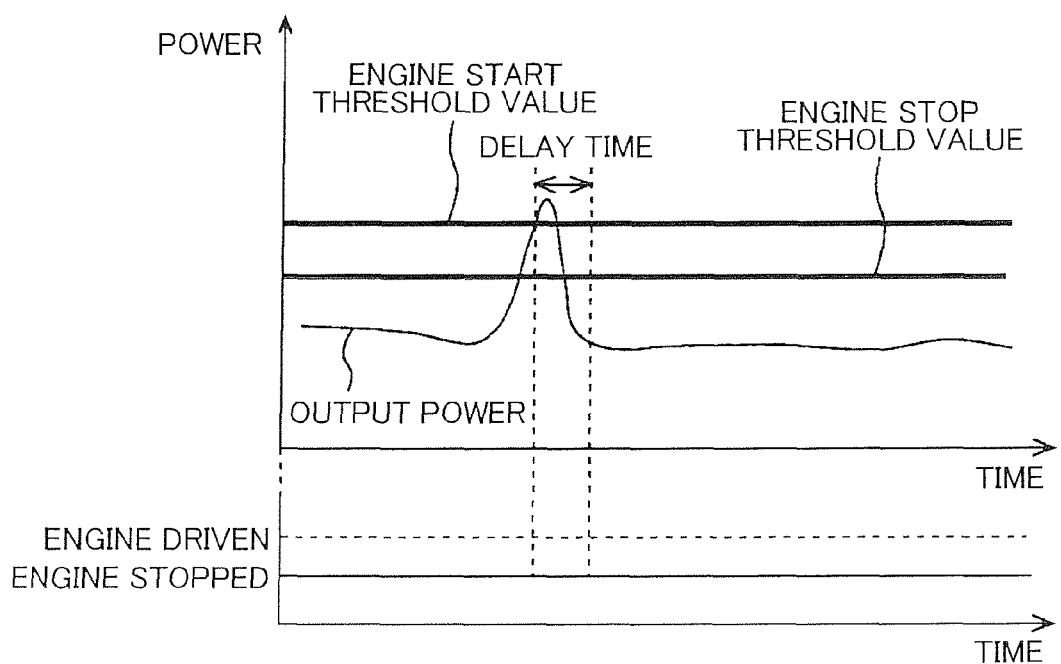
FIG. 4 is a view (No. 2) showing a state of the engine, etc.

In this embodiment, if the condition that the output power of the vehicle is equal to or larger than the engine start threshold value, namely, the starting condition based on the operation of the driver, is satisfied, the engine 100 is started after a given delay time elapses, as shown in FIG. 3. If the starting condition ceases to be satisfied before the delay time elapses after the starting condition is satisfied, as shown in FIG. 4, the engine 100 is kept stopped. The delay time varies according to the vehicle speed. As one example, the delay time is set to a longer period of time as the vehicle speed is higher. The delay time is predetermined by a developer based on the result of experiments, simulation, and the like.

Figure 5:
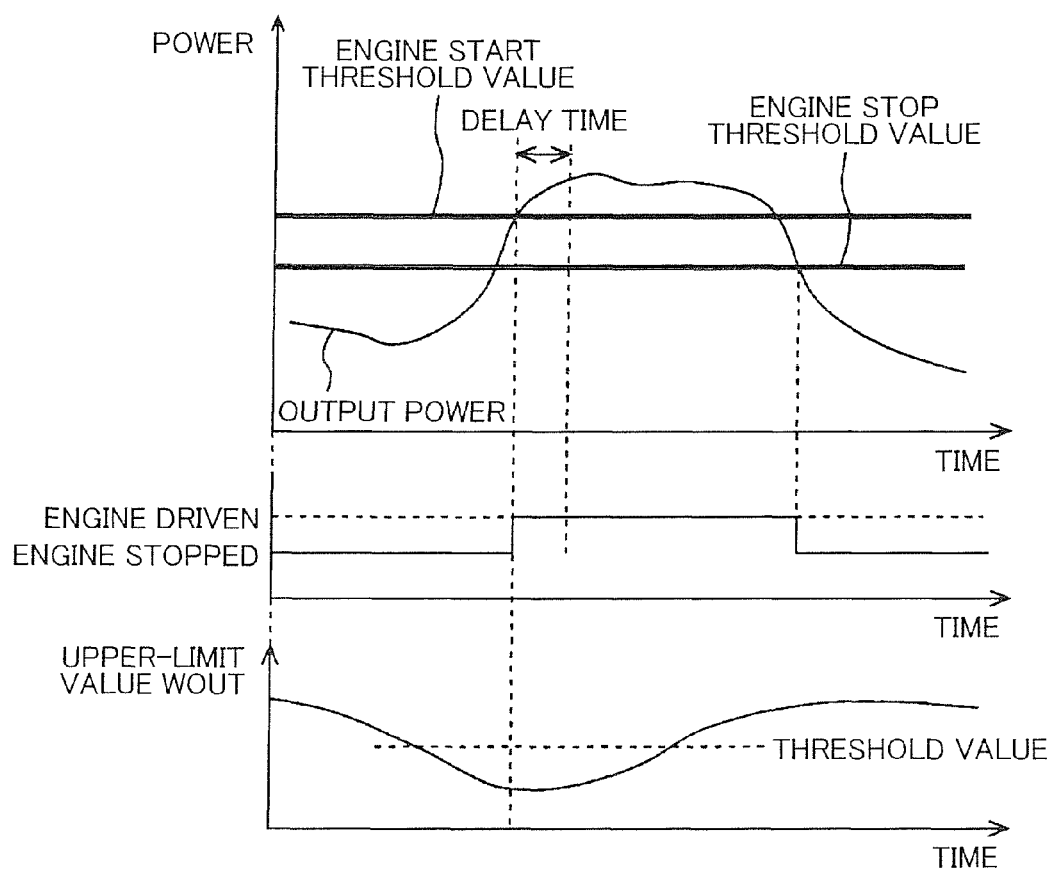
FIG. 5 is a view (No. 3) showing a state of the engine, etc.

If, on the other hand, any of conditions for cancelling the delaying operation is satisfied, the engine 100 is started before the delay time elapses after the starting condition is satisfied. As one example, if the output of the battery 150 is reduced, the engine 100 is started before the delay time elapses after the starting condition is satisfied. More specifically, the ECU 170 calculates the upper-limit value WOUT of the output (discharged electric power) of the battery 150, based on the temperature, remaining capacity, etc. of the battery 150. If the upper-limit value WOUT is smaller than a given threshold value, the ECU 170 starts the engine 100 without carrying out the delaying operation, as shown in FIG. 5, when the starting condition based on the operation of the driver is satisfied.

The cancelling conditions are not limited to the condition that the output of the battery 150 is reduced, but may be set as appropriate. Also, output restriction for curbing deterioration of the battery 150 may be excluded from the cancelling conditions.

Figure 6:
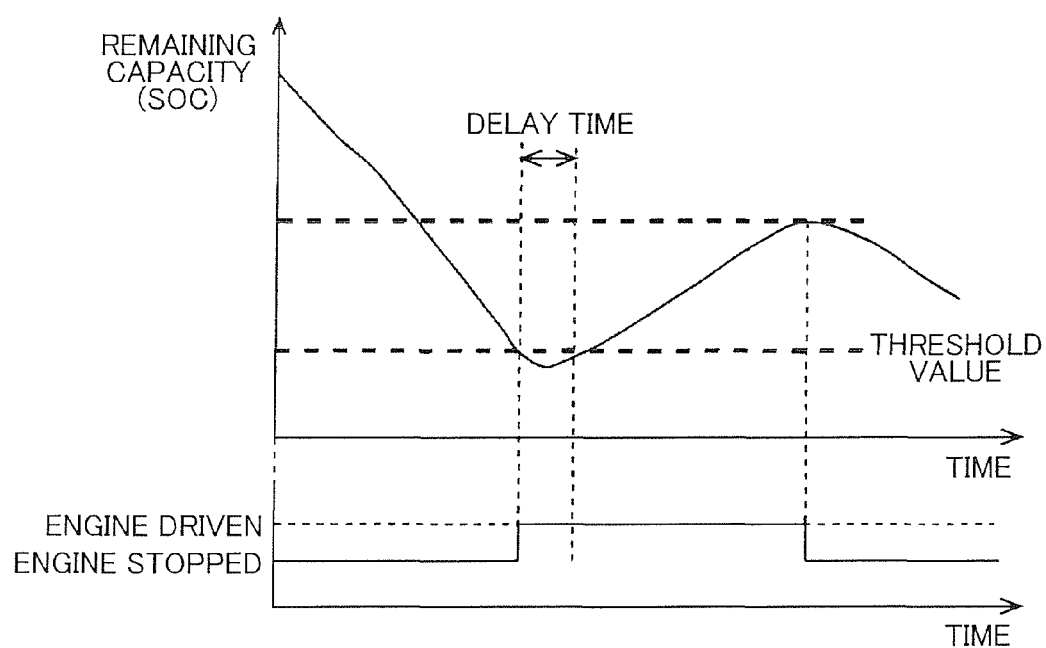
FIG. 6 is a view (No. 4) showing a state of the engine, etc.

In this embodiment, if a condition based on equipment installed on the vehicle, as well as the starting condition based on the operation of the driver, is satisfied, the engine 100 is started, as shown in FIG. 6. As one example, if the remaining capacity of the battery 150 is smaller than a given threshold value, the engine 100 is started. As another example, if the temperature of the coolant of the engine 100 is lower than a given threshold value when the heating function of the air conditioner 104 is turned on, the engine 100 is started. As shown in FIG. 6, if the condition based on the equipment installed on the vehicle is satisfied, the engine 100 is started before the above-described delay time elapses. Namely, if the condition based on the equipment installed on the vehicle is satisfied, the ECU 170 starts the engine 100 without carrying out the delaying operation.

Figure 7:
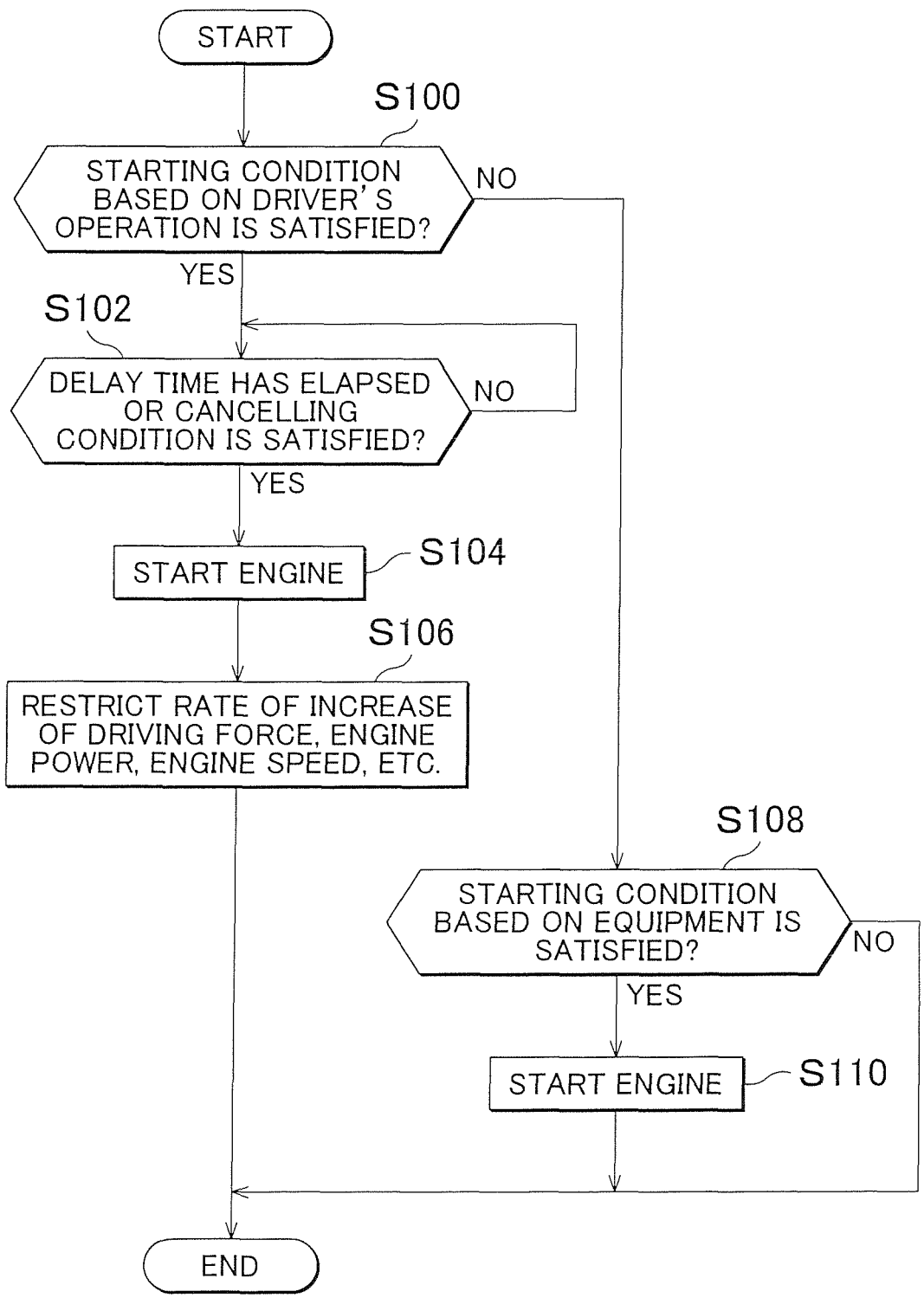
FIG. 7 is a flowchart illustrating a control process executed by an ECU.

Referring to FIG. 7, a control process executed by the ECU 170 in this embodiment will be described. The control process may be implemented by software, or may be implemented by hardware, or may be implemented through cooperation of software and hardware.

In step S100, it is determined whether a starting condition based on an operation of the driver is satisfied. If the starting condition based on the operation of the driver is satisfied (YES in step S100), it is determined in step S102 whether the delay time has elapsed, or a condition for cancelling the delaying operation is satisfied.

If the delay time has elapsed, or the cancelling condition is satisfied (YES in step S102), the engine 100 is started in step S104. Then, in step S106, the rate of increase of the driving force of the vehicle as a whole, the rate of increase of the output power of the engine 100, the rate of increase of the output shaft speed of the engine 100, etc., are restricted so as to curb rapid changes in the driving force.

If, on the other hand, a condition based on equipment, such as the battery 150 and the air conditioner 104, installed on the vehicle is satisfied (YES in S108), the ECU 170 starts the engine 100 in step S110 without carrying out the delaying operation.

It is to be understood that the embodiment disclosed herein is not restrictive but illustrative or exemplary in all aspects. The scope of the invention is not defined by the above description of the embodiment but defined by the appended claims, and is intended to include all changes within the range of the claims and equivalents thereof. The correspondence relationship between the major elements according to the embodiment and the major elements of the invention described in Summary of the Invention will be described. In the embodiment, the engine 100 corresponds to the "engine", the second motor-generator 120 corresponds to the "electric motor", the battery 150 corresponds to the "power storage device", and the ECU 170 corresponds to "controller".

What is claimed is:

1. A control apparatus for a vehicle including an engine installed on the vehicle as a drive source, an electric motor installed on the vehicle as a drive source, the electric motor being configured to run the vehicle even in a condition where the engine is stopped, the control apparatus comprising:
a controller configured to start the engine after a given delay time elapses, if a starting condition based on an operation of a driver is satisfied, the controller being configured to keep the engine stopped if the starting condition ceases to be satisfied before the delay time elapses after the starting condition is satisfied.

2. The control apparatus according to claim 1, wherein the controller is configured to set the delay time to a longer period of time as a speed of the vehicle is higher.

3. The control apparatus according to claim 1, further comprising
a power storage device installed on the vehicle, the power storage device being operable to supply electric power to the electric motor, wherein
the controller is configured to start the engine before the delay time elapses after the starting condition is satisfied, if an output of the power storage device is smaller than a threshold value.

4. The control apparatus according to claim 1, further comprising
a power storage device installed on the vehicle, the power storage device being operable to supply electric power to the electric motor, wherein
the controller is configured to start the engine before the delay time elapses after the starting condition is satisfied, if a remaining capacity of the power storage device is smaller than a threshold value.

5. The control apparatus according to claim 1, wherein
the controller is configured to start the engine before the delay time elapses after the starting condition is satisfied, if a condition based on equipment installed on the vehicle is satisfied.

* * * * *